US012734507B2

(12) United States Patent
Kim et al.

(10) Patent No.: US 12,734,507 B2
(45) Date of Patent: Sep. 15, 2026

(54) METHOD FOR PREPARING CARBON NANOTUBE-PRODUCING CATALYST

(71) Applicant: LG CHEM, LTD., Seoul (KR)

(72) Inventors: Eui Tae Kim, Daejeon (KR); Eun Jeong Lee, Daejeon (KR); Ki Hwan Kim, Daejeon (KR); Eu Gene Oh, Daejeon (KR); Sung Eun Park, Daejeon (KR); Geun Sung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 466 days.

(21) Appl. No.: 18/573,364

(22) PCT Filed: Jan. 12, 2023

(86) PCT No.: PCT/KR2023/000590
§ 371 (c)(1),
(2) Date: Dec. 21, 2023

(87) PCT Pub. No.: WO2023/136634
PCT Pub. Date: Jul. 20, 2023

(65) Prior Publication Data

US 2024/0286117 A1 Aug. 29, 2024

(30) Foreign Application Priority Data

Jan. 13, 2022 (KR) ........................ 10-2022-0005136

(51) Int. Cl.
*B01J 23/75* (2006.01)
*B01J 27/236* (2006.01)
(Continued)

(52) U.S. Cl.
CPC ............ *B01J 23/75* (2013.01); *B01J 27/236* (2013.01); *B01J 35/395* (2024.01); *B01J 35/612* (2024.01);
(Continued)

(58) Field of Classification Search
None
See application file for complete search history.

(56) References Cited

U.S. PATENT DOCUMENTS 7,438,949 B2 10/2008 Weidman
2003/0064169 A1* 4/2003 Hong ................ H01J 37/32697 118/723 E
(Continued)

FOREIGN PATENT DOCUMENTS

CN 103771389 A 5/2014
CN 104609386 A 5/2015
(Continued)

OTHER PUBLICATIONS

Wang Zhenting et al., Materials Surface Engineering Technology, Harbin Institute of Technology Press, Sep. 2011, pp. 133-134.

*Primary Examiner* — John J Figueroa
(74) *Attorney, Agent, or Firm* — BRYAN CAVE LEIGHTON PAISNER LLP

(57) ABSTRACT

The present invention relates to a method for preparing a carbon nanotube-producing catalyst using chemical vapor deposition method. Using the above preparation method, a uniform and thin coating layer can be formed even on the surface of a support having a high-specific-surface-area having a 3D structure, and high-quality and low-diameter carbon nanotubes can be produced using the catalyst prepared through this method.

10 Claims, 2 Drawing Sheets

(51) Int. Cl.

| | |
|---|---|
| ***B01J 35/30*** | (2024.01) |
| ***B01J 35/61*** | (2024.01) |
| ***B01J 35/73*** | (2024.01) |
| ***B01J 37/02*** | (2006.01) |
| ***B01J 37/16*** | (2006.01) |
| ***C01B 32/162*** | (2017.01) |

(52) U.S. Cl.

CPC ........... *B01J 35/613* (2024.01); *B01J 35/615* (2024.01); *B01J 37/0217* (2013.01); *B01J 37/0221* (2013.01); *B01J 37/16* (2013.01); *C01B 32/162* (2017.08); *B01J 35/73* (2024.01); *B01J 2235/00* (2024.01); *B01J 2235/30* (2024.01)

(56) References Cited

U.S. PATENT DOCUMENTS

| | | | |
|---|---|---|---|
| 2006/0083674 | A1 | 4/2006 | Maruyama et al. |
| 2007/0084404 | A1 | 4/2007 | Verghese et al. |
| 2008/0075651 | A1 | 3/2008 | Higashi et al. |
| 2008/0095695 | A1 | 4/2008 | Shanov et al. |
| 2009/0246367 | A1 | 10/2009 | Huotari et al. |
| 2010/0298125 | A1 | 11/2010 | Kim et al. |
| 2013/0216811 | A1* | 8/2013 | Ghasemi-Nehjad ........................ C04B 35/565 428/221 |
| 2014/0295098 | A1 | 10/2014 | Shanov et al. |
| 2015/0137414 | A1 | 5/2015 | Shanov et al. |
| 2015/0238937 | A1* | 8/2015 | Kang .................. B01J 23/8877 427/249.1 |
| 2015/0274529 | A1 | 10/2015 | Kim et al. |
| 2018/0162734 | A1* | 6/2018 | Kang ...................... B01J 6/004 |
| 2019/0126255 | A1 | 5/2019 | Seo et al. |
| 2020/0231443 | A1 | 7/2020 | Ryu et al. |

FOREIGN PATENT DOCUMENTS

| | | | |
|---|---|---|---|
| CN | 104870363 | A | 8/2015 |
| CN | 105463404 | A | 4/2016 |
| CN | 108122870 | A | 6/2018 |
| CN | 110734053 | A | 1/2020 |
| JP | 2006-112022 | A | 4/2006 |
| JP | 2010-511580 | A | 4/2010 |
| JP | 4584142 | B2 | 11/2010 |
| JP | 2011-132068 | A | 7/2011 |
| JP | 4730707 | B2 | 7/2011 |
| JP | 2015-151277 | A | 8/2015 |
| KR | 10-2010-0026151 | A | 3/2010 |
| KR | 10-1038750 | B1 | 6/2011 |
| KR | 10-2012-0139453 | A | 12/2012 |
| KR | 10-2015-0045307 | A | 4/2015 |
| KR | 10-2017-0014527 | A | 2/2017 |
| KR | 10-2018-0101222 | A | 9/2018 |
| KR | 10-2019-0048554 | A | 5/2019 |
| KR | 10-2020-0141772 | A | 12/2020 |
| KR | 10-2021-0036725 | A | 4/2021 |
| KR | 10-2283872 | B1 | 8/2021 |

* cited by examiner

METHOD FOR PREPARING CARBON NANOTUBE-PRODUCING CATALYST

CROSS-REFERENCE TO RELATED APPLICATIONS

The present application is a national phase entry pursuant to 35 U.S.C. § 371 of International Application no. PCT/KR2023/000590 filed on Jan. 12, 2023, and claims priority to and the benefit of Korean Patent Application No. 10-2022-0005136, filed on Jan. 13, 2022, the disclosures of which are incorporated herein by reference in their entirety.

FIELD

The present invention relates to a method for preparing a carbon nanotube-producing catalyst that is small, uniform and has excellent catalytic activity, by using chemical vapor deposition (CVD).

BACKGROUND

Carbon nanotube materials include fullerenes, carbon nanotubes (CNTs), graphenes, graphite nanoplates, and the like, according to the shape of the material, and among them, the carbon nanotubes are macromolecules in which a hexagonal honeycomb-shaped graphite sheet, in which one carbon atom is bonded to other three carbon atoms, is rolled up to have a diameter of nanometer proportions.

The carbon nanotubes are hollow and light, and have electrical conductivity as good as copper, thermal conductivity as excellent as diamond, and tensile force equivalent to that of steel. According to the rolled-up shape, the carbon nanotubes may be classified into single-walled carbon nanotubes (SWCNTs), multi-walled carbon nanotubes (MWCNTs), and rope carbon nanotubes.

Recently, research on carbon nanotube synthesis technology capable of synthesizing a large amount of carbon nanotubes at one time is being actively conducted, and chemical vapor deposition (CVD) using a fluidized bed reactor among various methods can easily synthesize a large amount of carbon nanotubes, and thus, is most preferred in the actual industrial field.

Specifically, in the chemical vapor deposition, a particle-shaped catalyst for producing carbon nanotubes is filled in a fluidized bed reactor, and then is made to float while injecting a carbon source gas and a flow gas into the fluidized bed reactor. Thereafter, the reactor is heated to decompose the carbon source gas on the surface of the floating catalyst, thereby synthesizing carbon nanotubes.

In the production process for carbon nanotubes using the chemical vapor deposition, the activity of the catalyst acts as a main factor that can determine the productivity of the overall production process, and accordingly, studies are actively conducted on a catalyst having higher activity and a production method thereof. Conventionally, the most commonly used method for preparing a catalyst is a support method in which a support is immersed in a solution in which an active ingredient precursor is dissolved, the active ingredient precursor is placed on the inside and surface of the support, and then drying and firing are performed to prepare catalyst particles. The support method is advantageous in terms of the simplicity of the process and ease of mass production of the catalysts, but is disadvantageous in that there is a limitation on the uniformity of the distribution of the active ingredient on the support. Non-uniformity of the distribution of the active ingredient on the catalyst results in deterioration of the uniformity of the physical properties of the finally produced carbon nanotubes. In addition, catalyst preparation methods such as sputtering or electron beam physical vapor deposition are also being conducted. However, such deposition techniques have a limitation in the uniformity of the formation of a deposition film on a high-specific-surface-area support having a 3D structure.

Therefore, research on a method for preparing a novel catalyst for producing high-quality carbon nanotubes by forming a uniform coating layer on a high-specific-surface-area support is required.

(Patent Document 1) KR 10-2020-0141772 A (Patent Document 2) KR 10-2018-0101222 A

SUMMARY

An object of the present invention is to provide a method for preparing a carbon nanotube-producing catalyst capable of producing high-quality carbon nanotubes, particularly carbon nanotubes with a uniform diameter distribution.

TECHNICAL SOLUTION

According to an aspect of the present invention, there is provided a method for preparing a carbon nanotube-producing catalyst.

Specifically, (1) the present invention provides a method for preparing a carbon nanotube-producing catalyst, the method comprising: loading a support on a substrate in a chamber (S1); and forming a catalyst layer on a surface of the support using chemical vapor deposition (S2), wherein, (S2) comprises pulsing a catalyst precursor gas into the chamber (S2-1), and purging the inside of the chamber with an inert gas (S2-2), and sequentially repeating S2-1 and S2-2 1 to 40 times.

(2) The present invention provides the method for preparing a carbon nanotube-producing catalyst according to (1), further comprising a pretreatment step of drying the support in a vacuum state (S0).

(3) The present invention provides the method for preparing a carbon nanotube-producing catalyst according to (1) or (2), wherein the support is a metal oxide support having a hydroxyl group on a surface thereof.

(4) The present invention provides the method for preparing a carbon nanotube-producing catalyst according to any one of (1) to (3), wherein the support has a specific surface area of 1 to 300 $m^2/g$.

(5) The present invention provides the method for preparing a carbon nanotube-producing catalyst according to any one of (1) to (4), wherein the support has a number-average particle size of 0.5 to 100 μm.

(6) The present invention provides the method for preparing a carbon nanotube-producing catalyst according to any one of (1) to (5), wherein the support is at least one selected from the group consisting of aluminum oxide, hydrotalcite, and boehmite.

(7) The present invention provides the method for preparing a carbon nanotube-producing catalyst according to any one of (1) to (6), wherein the catalyst precursor is at least one selected from the group consisting of Co, Fe, Ni, V, and Mo.

(8) The present invention provides the method for preparing a carbon nanotube-producing catalyst according to any one of (1) to (7), wherein S2 is performed under a pressure condition of 0.1 to 10 Torr.

(9) The present invention provides the method for preparing a carbon nanotube-producing catalyst according to any one of (1) to (8), wherein S2 is performed at 80 to 200° C.

(10) The present invention provides the method for preparing a carbon nanotube-producing catalyst according to any one of (1) to (9), further comprising reducing the catalyst layer (S3).

A carbon nanotube-producing catalyst prepared using a catalyst preparation method according to the present invention has a thin catalyst layer and also has a uniform distribution, thereby making it possible to uniformly grow carbon nanotubes with a small diameter.

In addition, a carbon nanotube-producing catalyst prepared using a catalyst preparation method according to the present invention has great amounts of active components and exhibits good coverage, thereby making it possible to produce carbon nanotubes at high yield.

DETAILED DESCRIPTION

Figure 1:
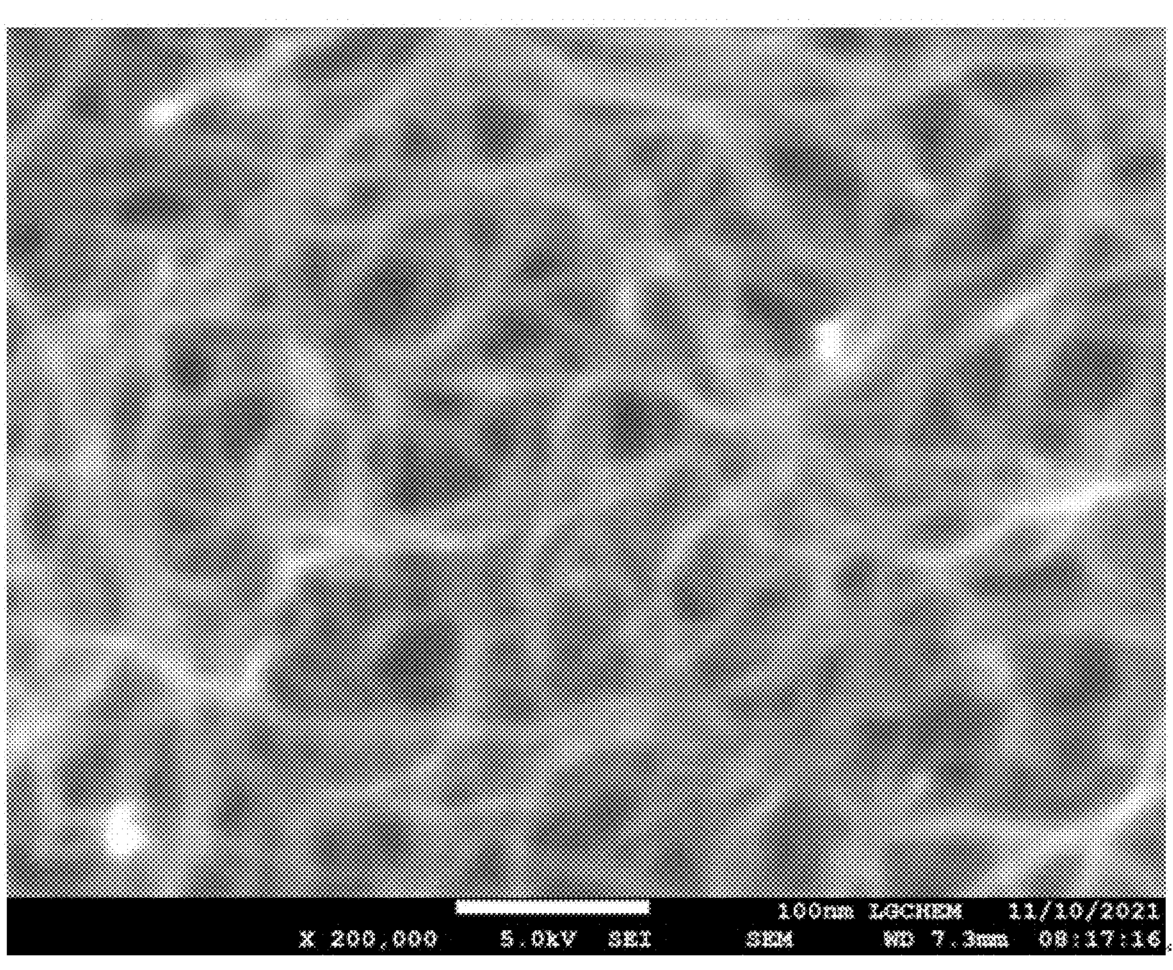
FIG. 1 shows a SEM image of carbon nanotubes prepared using a catalyst prepared in Example 1 of the present invention.

Hereinafter, the present invention will be explained in more detail.

It will be understood that words or terms used in the specification and claims shall not be interpreted as the typical or lexical meaning, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Method for Preparing Carbon Nanotube-Producing Catalyst

A catalyst used in a carbon nanotube production process using a chemical vapor deposition is generally prepared using a support method. Producing a catalyst using the support method provides advantages of being simple and economical, but in many cases, an active ingredient is not uniformly supported on the surface of a support particle during a support process. Accordingly, even when synthesizing carbon nanotubes using the catalyst thus produced, there is a problem in that the carbon nanotubes do not grow uniformly. Therefore, there are increasing demands for a catalyst capable of synthesizing carbon nanotubes more uniformly and a production method therefor. Accordingly, the present invention provides a method for preparing a novel catalyst for producing carbon nanotubes capable of uniformly synthesizing high-quality carbon nanotubes.

Specifically, the present invention provides a method for preparing a carbon nanotube-producing catalyst, the method including: loading a support on a substrate in a chamber (S1); and forming a catalyst layer on a surface of the support using chemical vapor deposition (S2), wherein, (S2) comprises pulsing a catalyst precursor gas into the chamber (S2-1), and purging the inside of the chamber with an inert gas (S2-2), and sequentially repeating S2-1 and S2-2 1 to 40 times.

In the present invention, a catalyst layer is formed on the surface of a support by using chemical vapor deposition (CVD) rather than a conventional support method, and this makes it possible to prepare a catalyst having a uniform catalyst layer with a small surface thickness.

Hereinafter, the method for preparing a carbon nanotube-producing catalyst according to the present invention will be described in more detail step by step.

Loading Step (S1)

In order to form the catalyst layer on the surface of the support, a step of loading the support on a substrate in a chamber is performed first. In order to form a uniform coating layer on the surface of the support particle, it is necessary to maximize a contact area between the catalyst precursor gas to be introduced later and the support, and to this end, the support may be loaded on the substrate in the chamber to maximize the contact area. In particular, in the present invention, since the coating layer is formed on a particle-shaped support rather than a planar support, the loading step is essential for forming a uniform coating layer.

Specifically, the loading may be performed by applying support particles thinly and evenly on the substrate, and the application may be performed using equipment such as a blade coater, a roll press, or a dip coater. Also, the physical structure of the support particles should not be collapsed or the support particles should not be decomposed during the application process, and therefore the application should be performed under appropriate conditions.

Also, before the loading step (S1), a step of pre-treating the support (S0) may be additionally performed. When the moisture content in the support is relatively high, it is likely that the reaction of the catalyst precursor gas injected in a later step may not occur smoothly, or undesired side reactions may occur. Therefore, it is necessary to minimize the moisture content in the support as much as possible, and to this end, the pre-treatment may be performed.

The pre-treatment may be performed by drying the support in a vacuum state, and the moisture content in the support after the pre-treatment may be 100 ppm or less, preferably 10 ppm or less. When the moisture content in the support is low as described above, the subsequent formation of the coating layer may be performed more favorably. Also, the specific temperature and time conditions for the pre-treatment may vary depending on the type or amount of the support to be pre-treated, but the pre-treatment temperature may be 300° C. or less, preferably 150° C. or less to prevent thermal decomposition of the support. In addition, vacuum during this pre-treatment may mean that the pressure is 0.01 Torr or less.

Specifically, the support included in the carbon nanotube-producing catalyst according to the present invention may be a metal oxide support having a hydroxyl group on the surface thereof. When a hydroxyl group is present on the surface of the support, it is advantageous in an atomic layer deposition. In addition, the specific surface area of the support may be 1 to 300 $m^2/g$, preferably 10 to 200 $m^2/g$, and the number-average particle size of the support may be 0.5 to 100 μm, preferably 1 to 20 μm. When the physical properties of the support satisfy the above conditions, it is possible to coat a large amount of the catalytic component while satisfactorily maintaining the mechanical strength of the support itself.

In addition, the bulk density of the support may be 0.05 to 1 g/cc, preferably 0.1 to 0.5 g/cc. When the bulk density of the support is within the above-described range, the support has an advantage in that a large amount of the active component may be coated on the support, relative to the volume of the support, thereby increasing the activity of the catalyst.

More specifically, the support may be at least one selected from the group consisting of aluminum oxide ($Al_2O_3$), hydrotalcite, and boehmite. The supports of the above-described type are advantageous in that the supports strongly interact with the catalyst to maintain the dispersion of catalyst particles during the growth of carbon nanotubes, thereby making it possible to produce carbon nanotubes with a uniform diameter. Therefore, the supports are particularly suitable for use as supports in the catalyst preparation method according to the present invention.

Also, the loading step may further include, after loading the support on the substrate through the previous step, a step of heating the substrate to 100 to 400° C. After the support is loaded on the substrate, moisture remaining in the support may be further removed by heating the substrate to be within the above-described temperature range. In this view point, the heating may be performed under reduced pressure conditions of 10 Torr or less, preferably 1 Torr or less or 0.1 Torr or less.

Step of Forming Catalyst Layer (S2)

After loading the support on a substrate through the previous steps, a catalyst layer may be formed on the surface of the support through chemical vapor deposition in the chamber, and this catalyst layer formation step may be performed by sequentially repeating, 1 to 40 times: a step of pulsing a catalyst precursor gas into the chamber (S2-1), and a step of purging the inside of the chamber with an inert gas (S2-2).

Each time a cycle of the steps S2-1 to S2-2 is performed, a catalyst layer having a certain thickness may be formed, and a catalyst layer having the optimal thickness may be achieved by repeating the cycle 1 to 40 times, preferably 2 to 20 times. In this case, the catalyst layer may have a thickness of 0.5 nm to 5 nm, preferably 0.5 nm to 2 nm. This thickness is smaller than that of a catalyst prepared by conventional support methods, and in the present invention, a thin catalyst layer is used, thereby making it possible to efficiently produce low-diameter carbon nanotubes.

Among the steps S2-1 and S2-2, the step S2-1 is a step of feeding components of a coating layer to be formed on the surface of the support into the chamber, and a catalyst precursor is introduced. Specifically, the catalyst precursor may include at least one selected from the group consisting of Co, Fe, Ni, V, and Mo. More specifically, when the catalyst precursor includes Co, the catalyst precursor may be at least one selected from the group consisting of cobalt tricarbonyl nitrosyl, cobalt acetylacetonate, and dicobalt octacarbonyl. When the catalyst precursor contains Fe, the Fe precursor may be iron pentacarbonyl. When the catalyst precursor contains Ni, the Ni precursor may be nickel tetracarbonyl. When the catalyst precursor contains V, the V precursor may be vanadium hexacarbonyl. When the catalyst precursor contains Mo, the Mo precursor may be molybdenum hexacarbonyl. In the case of using the above-listed types of catalyst precursors, it is advantageous in that the catalyst precursors are easily vaporized and easily introduced into the chamber in gaseous form, thereby facilitating formation of a catalyst layer. Meanwhile, it is desirable in terms of catalytic activity that the catalyst precursor includes at least one of Co, Fe, or Ni. When the catalyst precursor further includes at least one of V or Mo in addition to at least one of Co, Fe, or Ni, the catalytic activity may be maximized. It is preferable that the catalyst precursor be vaporized and introduced in a gaseous form. A catalyst precursor, which is not easily vaporized, may be introduced together with an inert gas as a carrier gas. In this case, in the present invention, the combination of the catalyst precursor and the carrier gas is referred to as a catalyst precursor gas.

The catalyst precursor injected in this step is adsorbed onto the surface of the support loaded on the substrate, and the adsorbed precursor may be converted into a catalyst layer through a later step.

The injection rate and time of the catalyst precursor gas in this step may vary depending on the properties of the desired catalyst, but the catalyst precursor gas may be injected, for example, at 50 to 200 sccm for 10 seconds or less. In addition, the temperature of the catalyst precursor gas introduced in this step may be 0 to 25° C. When the above-described catalyst precursor gas injection conditions are satisfied, uniform deposition is possible.

After the step S2-1, a purging step (S2-2) is performed. The purpose of the purging step is to remove residual components not adsorbed onto the surface of the support, and purging is performed with an inert gas to achieve the above purpose. As the inert gas, commonly available nitrogen, argon, or helium gas may be used. The injection rate and time of inert gas in the purging step may be appropriately adjusted as needed, and the inert gas may be injected, for example, at 50 to 500 sccm for 10 to 300 seconds. When the purging step is not performed, the catalyst layer may be non-uniformly deposited, and the catalyst deposition amount may decrease from an inlet toward an outlet.

Step S2 including the above-described steps S2-1 and S2-2 may be performed under a pressure condition of 0.1 Torr to 10 Torr, preferably 0.1 Torr to 1 Torr. When catalyst layer deposition is performed under low pressure as described above, it is advantageous in that control of the thickness of the catalyst layer may be easy and uniform deposition is possible. When the pressure is lower than the pressure range above, the deposition rate is too slow; and when the pressure is higher than the pressure range above, it is disadvantageous in that it is difficult to control the thickness of the catalyst layer and uniform deposition is not achieved.

Step S2 including the above-described steps S2-1 and S2-2 may be performed at 80 to 200° C., preferably 100 to 150° C. When the chemical vapor deposition step is performed within the above-described temperature range, the catalyst layer may be deposited more favorably and stably.

Reduction step (S3)

After steps S1 and S2 described above, a step (S3) of reducing the catalyst layer may be further performed.

Specifically, the step of reducing the catalyst layer may be performed by heating at 300 to 700° C. for 30 minutes to 2 hours, using a furnace. This step provides a technical advantage that when this reducing step is performed, the nitrogen content in the catalyst layer is lowered due to the reduction of the components of the catalyst layer, and the purity of the active metal oxide in the catalyst layer is increased, so that the activity of the catalyst is further increased.

Hereinafter, the present invention will be described in more detail with reference to Examples and Experimental examples in order to specifically describe the present invention, but is not limited to Examples and Experimental Examples. The Examples according to the present invention may be modified in various different forms, and the scope of the present invention should not be interpreted to be limited to the Examples described below. Rather, the Examples of the present invention are provided so that this description will be thorough and complete, and will fully convey the scope of the present invention to those skilled in the art.

EXAMPLES

Materials

A pre-treatment was performed such that hydrotalcite having a specific surface area of 20 $m^2/g$ and a number-average particle size of 36 μm was dried in a vacuum chamber heated at 120° C. for 10 hours to make the moisture content become 10 ppm or less. As a catalyst precursor for forming an active layer, cobalt tricarbonyl nitrosyl was used.

Example 1

The pretreated hydrotalcite was applied thinly and evenly on a glass substrate using a blade coater. Thereafter, the substrate was loaded into a chamber, the pressure was reduced to 0.3 Torr or less, and then the substrate was heated to 150° C. After the heating was completed, cobalt tricarbonyl nitrosyl heated to 10° C. was pulse injected into the chamber for 0.1 seconds using a carrier gas, and 200 sccm of nitrogen gas was flowed for 20 seconds to complete the purging. The above processes were set as one cycle and the cycle was repeated 5 times in total. As a result, catalyst particles in which a cobalt oxide catalyst layer having a thickness of 1.4 nm was obtained.

Example 2

In Example 1, the above cycle was repeated 10 times to obtain catalyst particles in which a cobalt oxide catalyst layer having a thickness of 2.8 nm was formed.

Example 3

In Example 1, the above cycle was repeated 20 times to obtain catalyst particles in which a cobalt oxide catalyst layer having a thickness of 5.6 nm was formed.

Example 4

In Example 1, the above cycle was repeated 30 times to obtain catalyst particles in which a cobalt oxide catalyst layer having a thickness of 8.4 nm was formed.

Example 5

In Example 1, the above cycle was repeated 40 times to obtain catalyst particles in which a cobalt oxide catalyst layer having a thickness of 11.2 nm was formed.

Comparative Example 1

An immersion liquid was prepared by dissolving 5 g of $Co(NO_3)_2 \cdot 2H_2O$ in 100 ml of water, and then a hydrotalcite support same as that used in Example 1 was immersed in the immersion liquid. Thereafter, the support was dried at 100° C. and calcined in the air at 600° C. to obtain catalyst particles.

Comparative Example 2

In Example 1, the above cycle was repeated 50 times to obtain catalyst particles in which a cobalt oxide catalyst layer having a thickness of 14 nm was formed.

Comparative Example 3

In Example 1, the above cycle was repeated 45 times to obtain catalyst particles in which a cobalt oxide catalyst layer having a thickness of 12.6 nm was formed.

Experimental Example 1. Confirmation of Catalyst Properties

The properties of the catalysts prepared in Examples and Comparative Example were confirmed through the following method.

1) Catalyst layer thickness—Platinum (Pt) or carbon was sputtered on catalyst layer particles to a thickness of 100 nm, and thereafter, a sectional specimen was prepared using focused ion beam (FIB) or $Ar^+$ ion milling. The prepared specimen was analyzed using a SEM or TEM to measure the thickness of the catalyst layer.
2) Catalyst content—The catalyst content was confirmed through Inductively Coupled Plasma (ICP) component analysis, and Inductively Coupled Plasma Optical Emission Spectroscopy (ICP-OES) analysis was performed by dissolving 0.1 g of catalyst particles in 1 ml of hydrochloric acid and the resultant solution was diluted 10 times.

Measuring equipment: ICP-OES Agilent 5110

Measuring Conditions: RF Power 1300 W, Torch Height 15 mm, Plasma gas flow 15 L/min, Sample Gas flow 0.8 L/min, Aux. Gas flow 0.2 L/min, Pump Speed 1.5 ml/min 3) Coverage: The coverage was calculated using the previously measured catalyst content, catalyst layer thickness, specific surface area and catalyst density of the support, and was calculated through the following Equation.

Coverage=catalyst content/(catalyst layer thickness*support specific surface area*theoretical true density of catalyst)

4) Yield: The yield was calculated as a multiple obtained by measuring the weight of the produced carbon nanotubes per the input amount of the catalyst particles (including both catalyst and support).
5) Produced amount of carbon nanotubes per input amount of catalyst: This value was calculated as a multiple obtained by measuring the weight of the produced carbon nanotubes per the catalyst content (excluding support) of the input catalyst particles.

The measured values for each property are summarized in Table 1 below.

TABLE 1

| | Example 1 | Example 2 | Example 3 | Example 4 | Example 5 | Comp. Ex. 1 | Comp. Ex. 2 | Comp. Ex. 3 |
|---|---|---|---|---|---|---|---|---|
| Catalyst layer thickness (nm) | 1.4 | 2.8 | 5.6 | 8.4 | 11.2 | 15 | 14 | 12.6 |
| Catalyst content (wt %) | 1.5 | 3.0 | 6.0 | 9.0 | 12.0 | 7.0 | 15.0 | 13.5 |
| Coverage (%) | 10 | 10 | 10 | 10 | 10 | 5 | 10 | 10 |
| Yield (times) | 8.0 | 6.5 | 5.7 | 4.6 | 3.2 | 10.0 | 2.1 | 2.7 |

TABLE 1-continued

| | Example 1 | Example 2 | Example 3 | Example 4 | Example 5 | Comp. Ex. 1 | Comp. Ex. 2 | Comp. Ex. 3 |
|---|---|---|---|---|---|---|---|---|
| Produced amount of carbon nanotubes per input amount of catalyst (times) | 533 | 217 | 95 | 51 | 27 | 143 | 14 | 20 |

As seen in Table 1, it can be confirmed that the catalyst prepared in Examples according to the present invention exhibits higher coverage even at lower catalyst content, and thus makes it possible to synthesize significantly larger amounts of carbon nanotubes than the catalysts of Comparative Example 2 and 3 prepared using ALD in the same way even when the same amount of catalyst is input.

Figure 2:
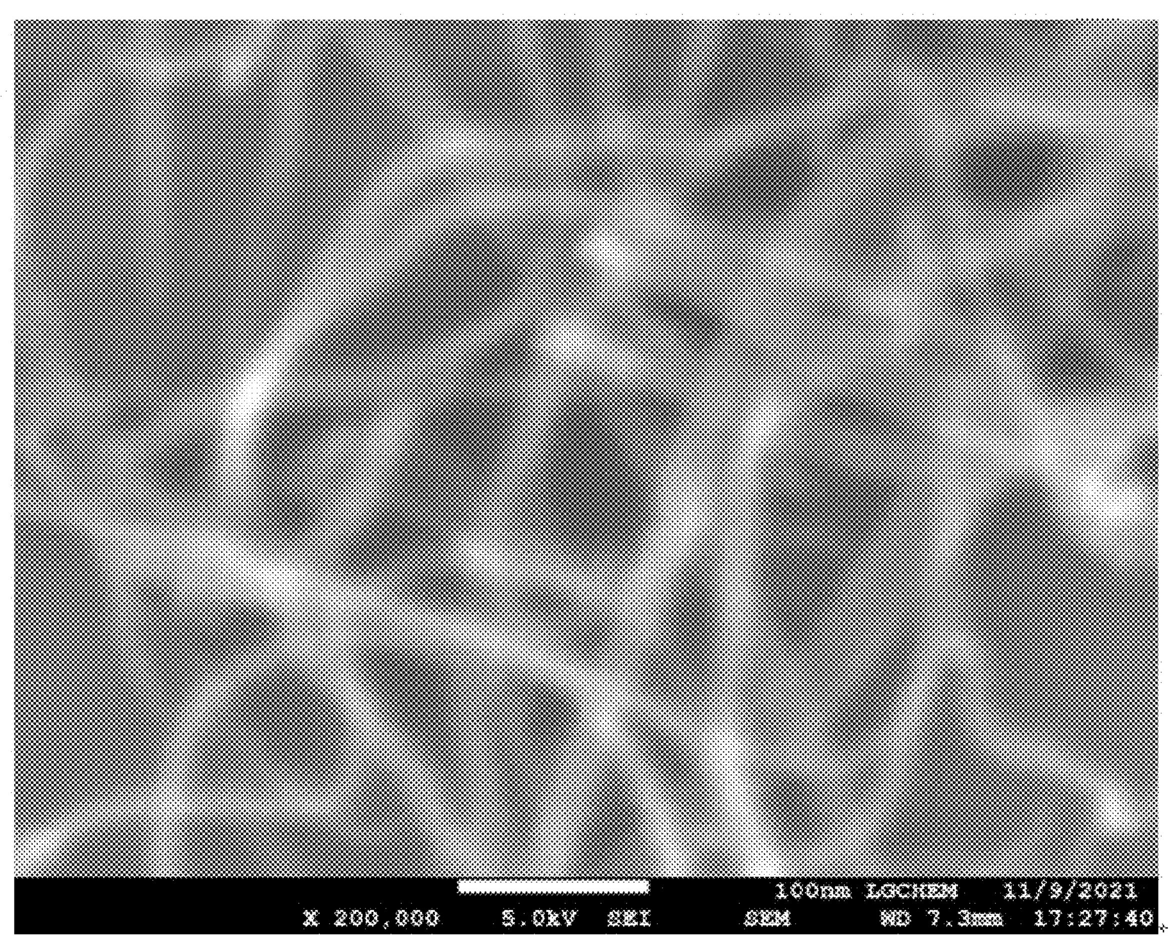
FIG. 2 shows a SEM image of carbon nanotubes prepared using a catalyst prepared in Comparative Example 1 of the present invention.

Experimental Example 2. Confirmation of Properties of Carbon Nanotubes Produced from Catalyst Carbon nanotubes were synthesized using the catalysts prepared in Examples and Comparative Examples. Specifically, mg of the catalyst was put into a tube furnace, and 500 sccm of nitrogen gas, 200 sccm of hydrogen gas, and 50 sccm of ethylene gas were injected at 670° C. for 90 minutes to synthesize carbon nanotubes. FIG. 1 shows a SEM image of 10 carbon nanotubes produced using the catalyst of Example 1, and FIG. 2 shows a SEM image of carbon nanotubes produced using the catalyst of Comparative Example 1. The SEM images were observed using JSM-7610F (JEOL Ltd.).

As seen in FIGS. 1 and 2, when the catalyst prepared in Examples according to the present invention is used, carbon nanotubes in which the density of carbon nanotubes per unit area is relatively high are produced. This means that the carbon nanotubes produced in Examples according to the present invention exhibit higher conductivity with respect to the same volume. Accordingly, it can be confirmed that when using the catalyst prepared in Examples according to the present invention, a larger amount of carbon nanotubes can be synthesized even using a smaller amount of the catalyst, and the synthesized carbon nanotubes may also have excellent electrical conductivity.

The invention claimed is:

1. A method for preparing a carbon nanotube-producing catalyst, the method comprising:

loading a support on a substrate in a chamber (S1); and forming a catalyst layer on a surface of the support using chemical vapor deposition (S2), wherein, (S2) comprises;

pulsing a catalyst precursor gas into the chamber (S2-1), and purging the inside of the chamber with an inert gas (S2-2), and sequentially repeating S2-1 and S2-2 1 to 40 times.

2. The method of claim 1, further comprising drying the support in a vacuum state (S0).

3. The method of claim 1, wherein the support is a metal oxide support having a hydroxyl group on a surface thereof.

4. The method of claim 1, wherein the support has a specific surface area of 1 to 300 $m^2$/g.

5. The method of claim 1, wherein the support has a number-average particle size of 0.5 to 100 μm.

6. The method of claim 1, wherein the support is at least one selected from the group consisting of aluminum oxide, hydrotalcite, and boehmite.

7. The method of claim 1, wherein the catalyst precursor is at least one selected from the group consisting of Co, Fe, Ni, V, and Mo.

8. The method of claim 1, wherein S2 is performed under a pressure condition of 0.1 to 10 Torr.

9. The method of claim 1, wherein S2 is performed at 80 to 200° C.

10. The method of claim 1, further comprising a step of reducing the catalyst layer (S3).

* * * * *